(12) United States Patent
Wang

(10) Patent No.: US 12,373,642 B1
(45) Date of Patent: Jul. 29, 2025

(54) SYSTEMS AND METHODS FOR CONVERSION OF ADMINISTRATIVE SYSTEMS

(71) Applicant: DataInfoCom USA Inc, Austin, TX (US)

(72) Inventor: Wensu Wang, Katy, TX (US)

(73) Assignee: DataInfoCom USA, Inc., Austin, TX (US)

( * ) Notice: Subject to any disclaimer, the term of this patent is extended or adjusted under 35 U.S.C. 154(b) by 563 days.

(21) Appl. No.: 17/715,729

(22) Filed: Apr. 7, 2022

Related U.S. Application Data

(63) Continuation-in-part of application No. 17/110,247, filed on Dec. 2, 2020.

(60) Provisional application No. 62/976,191, filed on Feb. 13, 2020.

(51) Int. Cl.
*G06F 17/00* (2019.01)
*G06F 16/25* (2019.01)
*G06F 40/284* (2020.01)
*G06V 10/40* (2022.01)
*G06V 30/19* (2022.01)

(52) U.S. Cl.
CPC .......... *G06F 40/284* (2020.01); *G06F 16/258* (2019.01); *G06V 10/40* (2022.01); *G06V 30/19* (2022.01)

(58) Field of Classification Search
CPC ..... G06F 40/284; G06F 16/258; G06V 10/40; G06V 30/19
See application file for complete search history.

(56) References Cited

U.S. PATENT DOCUMENTS

| | | | |
|---|---|---|---|
| 6,151,608 A | 11/2000 | Abrams | |
| 9,996,799 B2 | 6/2018 | Bostick et al. | |
| 10,346,454 B2 | 7/2019 | Moeller-Bertram et al. | |
| 11,086,549 B2* | 8/2021 | Ramakrishnan | G06F 3/0647 |
| 11,790,262 B2 | 10/2023 | Ghatage et al. | |
| 2002/0138449 A1* | 9/2002 | Kendall | G06Q 10/10 705/75 |
| 2003/0041059 A1* | 2/2003 | Lepien | G06F 16/24556 707/999.005 |
| 2007/0288535 A1 | 12/2007 | Shitomi et al. | |

(Continued)

OTHER PUBLICATIONS

U.S. Appl. No. 17/110,247, filed Dec. 2, 2020 (Wang).
U.S. Appl. No. 17/687,632, filed Mar. 5, 2022 (Wang).
U.S. Appl. No. 17/107,873, filed Nov. 30, 2020 (Wang).

*Primary Examiner* — Greta L Robinson
(74) *Attorney, Agent, or Firm* — Chad Peterson

(57) ABSTRACT

Methods, systems and apparatuses, including computer programs encoded on computer storage media, are provided for automatically converting a legacy administration system to a target administration system. The data definitions, data items, data sets, product features, business functions/processes, business rules, and calculation modules of both systems are analyzed by an analysis system to determine elements in common. Common elements between the systems. are determined using AI techniques such as natural language processing (NLP). Elements of the legacy system not present in the target system are generated and the legacy system is then migrated to the target system. For data required by the target system not present in the legacy system, data-driven prediction models may be used to predict the required data.

22 Claims, 8 Drawing Sheets

(56) References Cited

U.S. PATENT DOCUMENTS

| | | |
|---|---|---|
| 2009/0119476 A1 | 5/2009 | Jernigan et al. |
| 2013/0132285 A1 | 5/2013 | Richards et al. |
| 2015/0019476 A1 | 1/2015 | Hiatt et al. |
| 2015/0019488 A1* | 1/2015 | Higginson ............ G06F 16/214 707/634 |
| 2017/0352041 A1 | 12/2017 | Ramamurthy et al. |
| 2018/0322396 A1 | 11/2018 | Ahuja-Cogny et al. |
| 2019/0065523 A1 | 2/2019 | Singh et al. |
| 2019/0197171 A1 | 6/2019 | Tiwari et al. |
| 2020/0012970 A1 | 1/2020 | Srivastava et al. |
| 2020/0257540 A1 | 8/2020 | Moreno et al. |

* cited by examiner

SYSTEMS AND METHODS FOR CONVERSION OF ADMINISTRATIVE SYSTEMS

CROSS-REFERENCE TO RELATED APPLICATIONS

The present application is a continuation-in-part of U.S. patent application Ser. No. 17/110,247, entitled "SYSTEMS AND METHODS FOR CONVERSION OF ADMINISTRATIVE SYSTEMS," filed Dec. 2, 2020, and claims the benefit of U.S. Provisional Patent Application No. 62/976,191, entitled "SYSTEMS AND METHODS FOR AUTOMATING ADMINISTRATIVE SYSTEM PROCESSES," filed Feb. 13, 2020, each of which is incorporated by reference herein in its entirety.

BACKGROUND

This specification relates generally to Artificial Intelligence (AI) technologies as applied to transforming administrative systems, such as insurance Policy Administration Systems (PAS), using the latest data-driven architectures and technologies. More specifically, this specification relates to automatic processes for conversion of data, processes, and products from a legacy system to a target system.

Currently, many businesses rely on cumbersome legacy administration systems with deprecated technologies, siloed and unscalable data structure, and manually intensive processes that are error-prone and difficult to scale. At times, a business may want to convert existing data sets and/or processes in a legacy administration system to a target administration system which meets business requirements, to improve operation efficiency, result accuracy, and process transparency. The resulting target system is more flexible, expandable, adaptable, repeatable, and scalable as compared to legacy systems.

SUMMARY

In accordance with the foregoing objectives and others, exemplary methods and systems are disclosed herein to transform and/or convert existing items, such as products, procedures, business rules, calculation modules, and/or data sets, in a legacy administration system to a specified, target administration system using the latest data-driven architectures and AI-empowered technologies.

The details of one or more embodiments of the subject matter of this specification are set forth in the accompanying drawings and the description below. Other features, aspects, and advantages of the subject matter will become apparent from the description, the drawings, and the claims.

DETAILED DESCRIPTION

Figure 1:
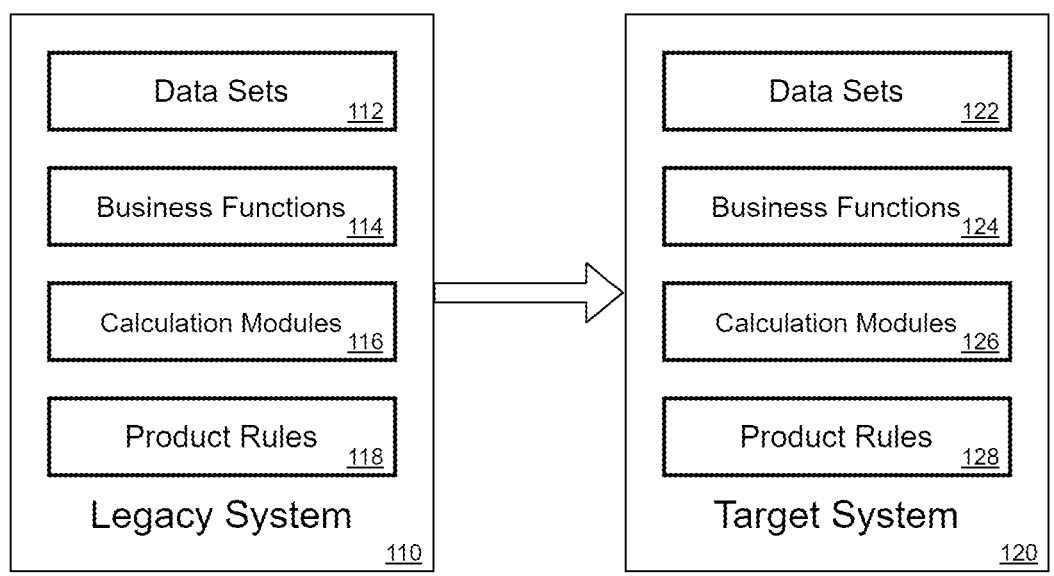
FIG. 1 illustrates the migration of a legacy administration system to a target administration system.

Systems and methods are disclosed herein for the conversion and/or migration of one or more legacy administration systems, e.g., ALIS, InsPro, DXC Cyberlife, DXC Graphtalk, DXC Ingenium, iWorks, etc., to a target administration system, e.g., Oracle Insurance Policy Administration, using various artificial intelligence (AI) and robotic process automation (RPA) techniques. The disclosed systems and methods enable the conversion and/or migration of some or all of the products, policies, processes, business functions, data definitions, data items, and any other elements of the legacy administration system(s). AI techniques include, but are not limited to, machine learning (ML), deep learning, natural language processing (NLP) (including information extraction (JE)), natural language understanding (NLU), natural language generation (NLG), computer vision, image processing and optical character recognition (OCR), speech recognition, signal processing, etc. Robotic process automation refers to the automation of repetitive tasks, thereby making the process less labor-intensive for humans.

As used herein, "historical data" refers to data sets which are accumulated in the implementation of the administrative systems which can be used to train or otherwise create a data-driven model, and generally includes multiple training instances, each instance may comprise one or more feature inputs with/or without a target output. The target output of a training set may also be referred to herein as a "label." "Current data" or "current input data" refers to data input into the trained model to generate a prediction, forecast, or other output.

AI models include one or more of the following: classification models, regression models, Markov chains, time series models, state space models, Bayesian models, decision trees (including boosted decision trees), neural networks, deep neural networks, convolutional neural networks, recurrent neural networks, long short term memory (LSTM) neural networks, kNN models, Prophet models, support vector machines, or any other appropriate supervised or unsupervised model, or combinations or ensembles (e.g., by bagging, boosting, random forest techniques) thereof. To train an AI model, the system will generally use a set of historical data, including input variables and a target. Multiple models with different hyperparameters may be created and evaluated to select a preferred model. In one embodiment, a hyperparameter autotuning system may be used to create, test, and select preferred models. Any created models may be periodically retrained using additional historical data and/or an evaluation of the outputs or predictions of the models to be retrained. Additionally, it also includes the latest developed types of the AI technologies, such as transfer learning, semi-supervised, graph neural network, probabilistic machine learning.

Natural language generation (NLG) refers to AI techniques for generating human-readable text from structured data. Such techniques include, but are not limited to, template-based text generation, trained NLG models, etc.

Natural language processing (NLP), natural language understanding (NLU), and natural language information extraction (IE) refer to AI techniques for extracting data from text and making comparisons between texts. These techniques include a set of natural language processing algorithms, including but not limited to, tokenization, word stemming, grammar analysis, bagging of words, term frequency-inverse document frequency (TF-IDF), latent dirichlet allocation (LDA), topic modeling, sentiment analysis, semantic analysis (e.g., doc2vec, word2vec), keyword identification, bi-directional attention flow (Bi-DAF) or Transformer networks (e.g., BERT, RoBERTa), etc., to extract information from the text, convert it into a structured format, and make comparison or otherwise process the text.

The methods and systems described herein provide for the conversion of data from a legacy administration system to a target administration system. As shown in FIG. 1, both the legacy system 110 and target system 120 include data sets (112, 122), business functions, processes, and/or rules (114, 124), calculation modules (116, 126), and/or product rules (118, 128). FIG. 1 illustrates administration systems for insurance providers, but the principles disclosed herein can be used to convert administration systems used in other industries.

The methods and systems for the migration of a legacy administration system to a target administration system are useful for a wide range of insurance and investment products and product administration systems in other industries, including but not limited to, life insurance (term and whole), disability insurance, casualty insurance, income protection insurance, employment insurance, annuities, etc. These insurance/investment products involve similar types of systems related to policy administration. Such systems may include but not limited to, customer data, policy data, and processes such as altering (e.g., increasing or decreasing) insurance coverage, increasing or decreasing contributions (e.g., for an investment product), billing, receiving payments or contributions, making payments (e.g., paying out on a policy retirement date, benefit payments), processing claims, making inflation adjustments to benefits, sending various communications (e.g., annual statements, policy schedules, payment notices, etc.), calculating and paying agent commissions, calculating premiums, etc.

The methods and systems described herein are able to use and synthesize all available information related to the migration of the legacy systems to the target system, convert any relevant unstructured data into structured data, identify relevant insurance policy documents and extract relevant information from such documents, analyze the legacy system (and the target system when needed) to determine policies and products to migrate to the target system, analyze the products and policies to be migrated for any functionalities and/or data items required by those products and policies, identify functionality in the target system that matches functionality in the legacy system, identify data items in the target system that match data items in the legacy system, create new policies in the target system based on legacy policies, create new product rules in the target system based on legacy product rules, create new product features in the target system based on legacy product features, create new business rules in the target system based on legacy business rules, create new calculation modules in the target system based on legacy calculation modules, create new business functions in the target system based on legacy business functions, create new data items in the target system based on legacy data items, identify data items needed by any functionality in the legacy system but not yet implemented in the target system, etc.

Figure 2:
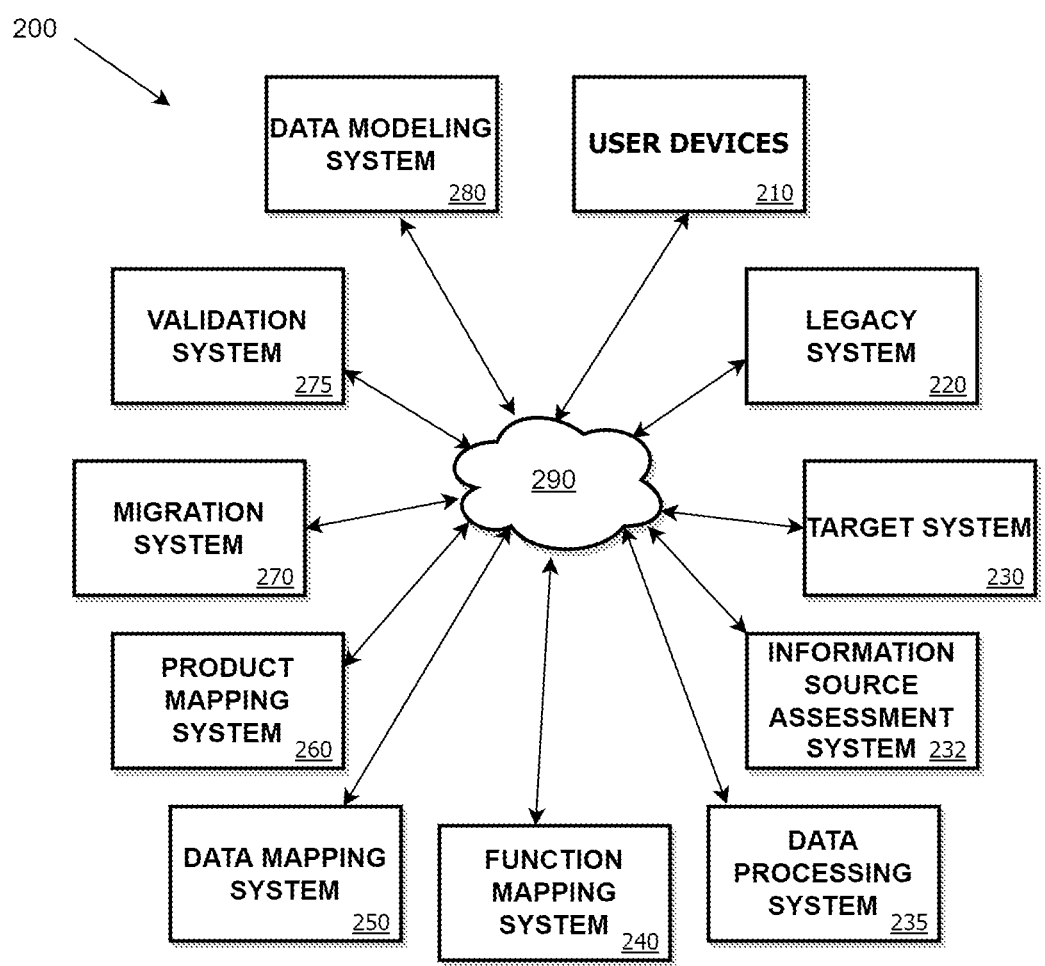
FIG. 2 is a block diagram of an example system for migrating a legacy administration system to a target administration system.

Referring to FIG. 2, a block diagram of an exemplary system 200 for use in migration of the legacy administration system is illustrated. The conversion system may include user devices 210, one or more legacy administration systems 220, a target administration system 230, an information source requirement assessment system 232, a data processing system 235, a function mapping system 240, a data mapping system 250, a product mapping system 260, a migration system 270, a validation system 275, and a data modeling system 280. The system components may be remote from each other and interact through a communication network 290. Non-limiting examples of communication networks include local area networks (LANs), wide area networks (WANs) (e.g., the Internet), etc.

In certain embodiments, a user may access any of the other systems via a user device 210 connected to the network 290. A user device 210 may be any computer device capable of accessing any of the other systems, such as by running a client application or other software, like a web browser or web-browser-like application.

The information source requirement assessment system 232 is adapted to assess the data sources for the legacy and target systems (including system architecture documents, system manuals, source code, data dictionaries, transaction data, policy data documents, product data documents, etc.) to determine their reliability and availability for the migration. If the available data sources are not reliable enough, or sufficient data sources are not available, the migration process may only be able to migrate part of the legacy system.

The data processing system 235 is adapted to extract, clean, format, and otherwise process data and/or information for use in the other systems. Information may be extracted from data sources relevant to an administration system, e.g., system architecture documents, system manuals, source code, data dictionaries, transaction data, policy data documents, product data documents, and others. To that end, the data processing system may be configured to use the information retrieval (IR) and information extraction (IE) techniques described in U.S. patent application Ser. No. 17/491, 361, entitled "SYSTEMS AND METHODS FOR INFORMATION RETRIEVAL AND EXTRACTION," filed Sep. 30, 2021, which is hereby incorporated by reference in its entirety. Those techniques include various methods for retrieving and/or extracting information from paper documents, pdf files, images, and other documents.

The function mapping system 240 is adapted to analyze the legacy and target administrative systems to determine correspondence between functionality in the systems, e.g., which function in the target system matches a given function in the legacy system, if any.

The data mapping system 250 is adapted to analyze the legacy and target administrative systems to determine correspondence between data items in the systems, e.g., which data item and/or data point in the target system matches a given data item or data point in the legacy system, if any.

The product mapping system 260 is adapted to analyze the legacy and target administrative systems to determine correspondence between products in the systems, e.g., which product in the target system matches a given product in the legacy system, if any.

The migration system 270 is adapted to migrate the products (e.g., insurance policies), features (e.g., renewal policy, payment options, beneficiaries, reinstatement, grace period, etc.), functionality (including business functions, business rules, and calculation modules), data definitions, data schemas, data structures, data points, and/or data sets in the legacy system to the target system. The migration system is also adapted to work with the validation system 275 to identify any missing items required by a migrated product or functionality and create the needed items in the target system. For product migration, the migration system identifies terms, conditions, and other product features of the legacy product and identifies corresponding product features in the target system. The system can then create new products in the target administration system based on the product features of the legacy product.

The validation system 275 is adapted to validate the migrated functionalities and products, by invoking the migrated functionalities on the target system and determining which functionalities fail (if any) due to missing data items or other dependencies. The validation system can then inform the migration system 270 of the missing dependencies so they can be created in the target system.

The data modeling system 280 includes one or more systems that work together to train or otherwise create (for types of models that do not require training (e.g., kNN)) prediction models. The data modeling system may be adapted to create any type of model, including but not limited to, classification models, regression models, Markov chains, time series models, state space models, Bayesian models, boosted decision trees, neural networks, convolutional neural networks, recurrent neural networks, LSTM neural networks, or any other appropriate model, or combinations or ensembles thereof. To train a model, the model creation system will generally use a set of historical data, including input variables and a target. Multiple models with different hyperparameters may be created and evaluated to select a preferred model. In one embodiment, a hyperparameter autotuning system may be used to create, test, and select preferred models. The data modeling system may also include systems adapted for cleaning, segmenting, processing, and/or aggregating data for use in training the models; systems adapted to extract features from unstructured data, such as written text, images, video, recorded audio, etc.; systems adapted to update and/or retrain models; and systems adapted to reduce the number of variables in a data set.

The data modeling system may be used to generate missing data in the target system. For example, if a legacy system is missing data that the target system requires, a data model may be trained using historical data from the legacy and/or target systems to generate the missing data.

Figure 3:
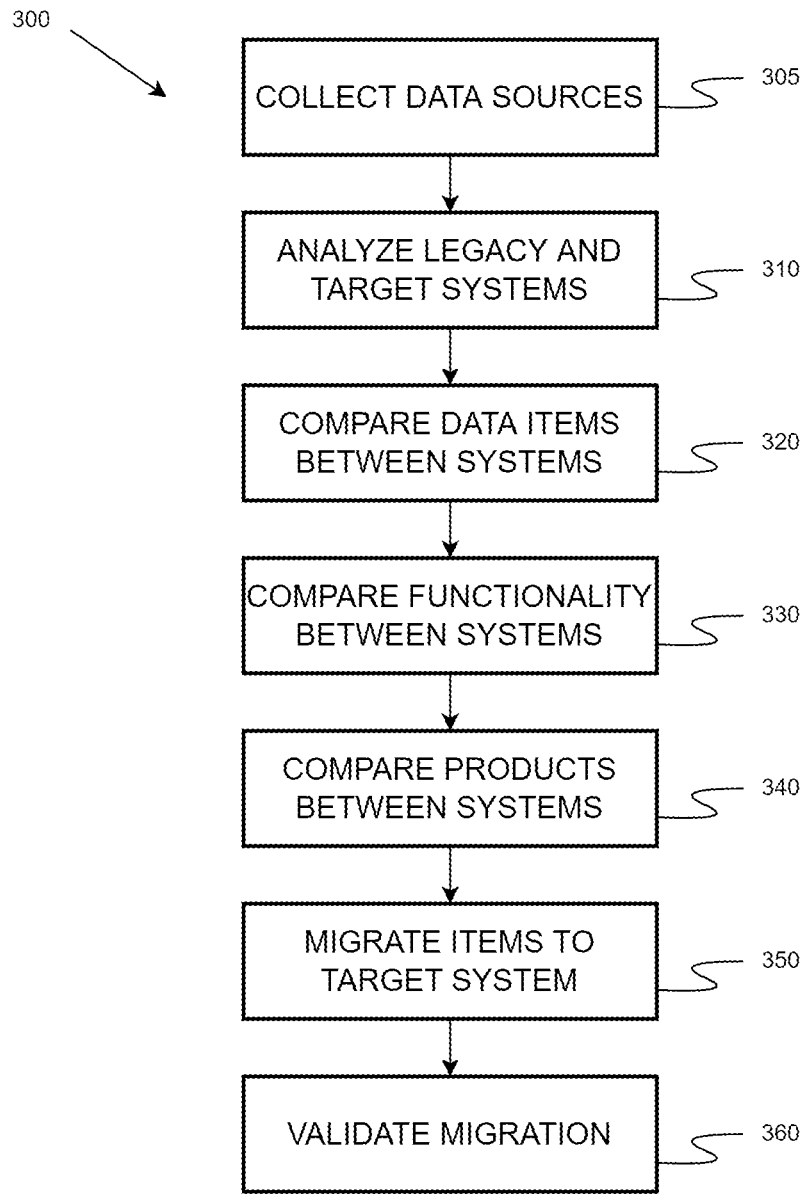
FIG. 3 illustrates an example method for migrating functionalities, products, and data elements of a legacy administration system to a target administration system.

FIG. 3 illustrates an example method 300 for migrating a legacy system 220 to a target system 230. In step 305, all information and data sources for both systems are collected. The data sources include system architecture documents, system manuals, source code, data dictionaries, transaction data, policy data documents, and product data documents.

In step 310, the legacy and target systems, and the information and data sources collected in the prior step, are analyzed to determine their specifications, including the system configuration, workflow, data structures, data definitions, calculation modules, product rules, product features, business functions, products, etc. For each functionality, associated data items are also identified. For PAS systems, the plan codes are also analyzed.

System architecture documents and system manuals may include detailed lists and descriptions of system functionality for all products. If available, they are a reliable source of required functionality and data items.

Source code is another reliable source, and may be analyzed using AI techniques to determine legacy PAS functionality, their usage, and their associated input and output fields.

Data dictionaries contain descriptions of data fields, and can be used determine the semantic content of data items. Data dictionaries may also be used to determine the similarity between data fields in the legacy PAS and data fields in the virtual PAS.

Transaction data, including batch job scripts and historical transaction data, includes historical records of functions that have been executed on the legacy PAS system. However, transaction data is limited to the data fields actually saved, and may not be stored for all functions, so may be limited in its usefulness.

Policy and product data can include actual data regarding policies and products in the system and is generally reliable.

All of these data sources, and others as applicable, may be analyzed to determine the relevant products and policies to be migrated to the target system, any functionality and/or data items required by these products and policies, any data items required by any required functionality, etc. The IR/IE techniques disclosed in U.S. patent application Ser. No. 17/491,361 may be used as needed to retrieve or extract information from these data sources.

In an embodiment, items required by either system are determined by analyzing the product and policies in the system to determine business functions, data points (including inputs and outputs associated with the business functions), and other items required by each product or policy.

In step 320, data items (e.g., data structures, data fields, data definitions, etc.) of the legacy system are compared with data items of the target system to build a mapping relationship between the data items in the two systems. Various AI techniques, including NLP, may be used to determine correspondence between items in the legacy system and items in the target system, as further described below. Data items in the legacy system but not in the target system, and vice versa, are identified.

In step 330, functionalities (e.g., business functions, calculation modules, etc.) of the legacy system are compared with functionalities of the target system to build a mapping relationship between the functionalities in the two systems. Various AI techniques, including NLP, may be used to determine correspondence between functionalities in the legacy system and functionalities in the target system, as further described below. Functionalities in the legacy system but not in the target system, and vice versa, are identified.

In step 340, products and policies of the legacy system are compared with products and policies of the target system to build a mapping relationship between the products and policies in the two systems. Various AI techniques, including NLP, may be used to determine correspondence between products and policies in the legacy system and functionalities in the target system, as further described below. Products and policies in the legacy system but not in the target system are identified.

In step 350, the data items, functionalities, and products and policies of the legacy system are migrated to the target system. Data items that are present in and/or required by products or functionalities in the legacy system but not present in the target system are created in the target system. For example, data structures, data definitions, and data points that are required by products or functionalities in the legacy system, but do not exist in the target system, are created in the target system.

After the required data items are created in the target system, the legacy system's data can be migrated to the target system. Data that is required by the target system but missing in the legacy system may be generated using a ML model trained to generate such data.

Functionality items that are present in and/or required by products in the legacy system but not present in the target system are created in the target system. For example, business functions and calculation modules that are required by products in the legacy system, but do not exist in the target system, will be created in the target system.

Products that are present in the legacy system but not present in the target system are created in the target system. Product features that exist in the legacy system, but not the target system, are also created in the target system.

In step 360, the migration is validated by testing the legacy functionality in the target system. Any errors, such as missing data fields, can then be corrected.

For some legacy systems, not all items will be able to be migrated to the target system. In this case, only part of the legacy system will be migrated.

Figure 4:
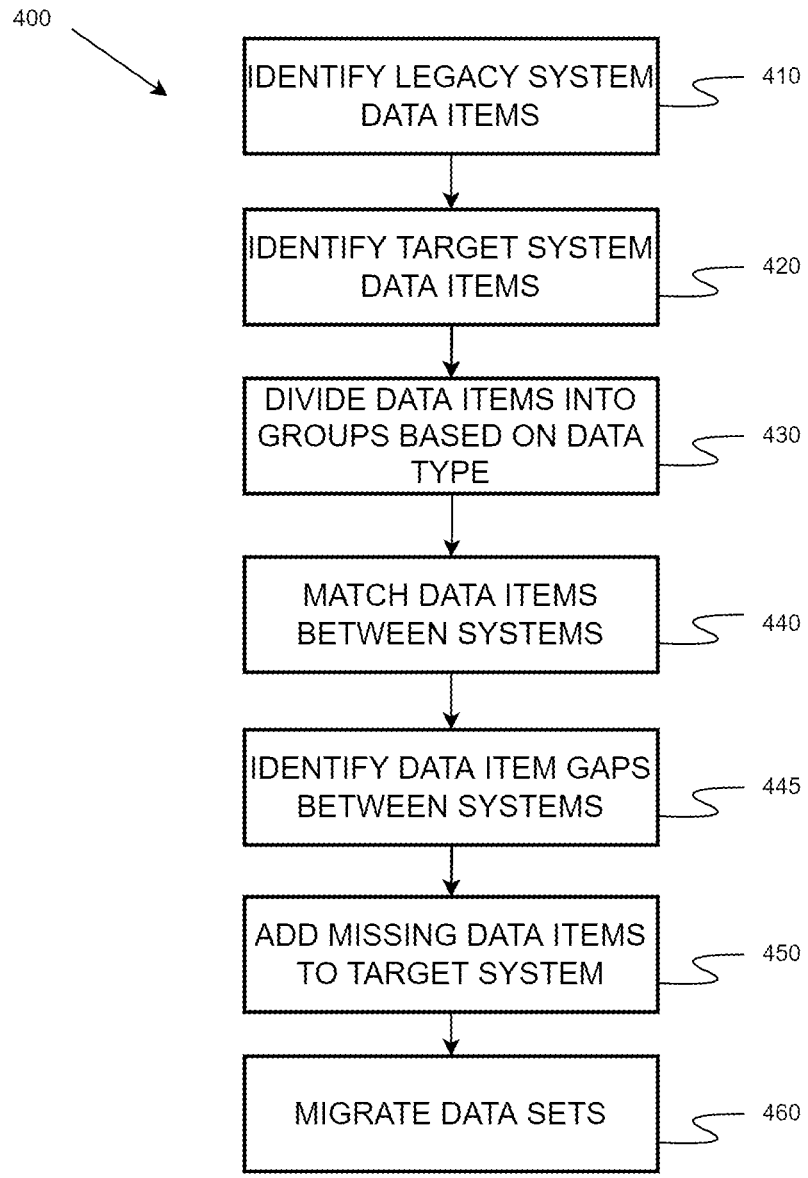
FIG. 4 illustrates one example of a method for migrating a data definition from a legacy administration system to a target administration system.

FIG. 4 illustrates an example of a method 400 for identifying data items, such as data definitions, data structures, data points, and data sets, in the target system 230 corresponding to required data items in the legacy system 220. In general, data definitions and data structures are templates for the storage of actual data and include one or more data fields. For example, a customer data definition may include data fields relating to each customer, e.g., personal information, financial information, asset information, etc.

In step 410, data descriptions and data types for data items in the legacy system are identified. For example, data item descriptions may be extracted from one or more data sources.

In step 420, data descriptions and data types for data items in the target system are identified.

In step 430, the data items are divided into groups with similar or identical data types.

In step 440, the analysis system matches data items in the legacy system with data items in the target system using one or more AI techniques. In an embodiment, the data descriptions (e.g., from a data source) are analyzed using NLP techniques to identify data items in the legacy system that match data items in the target system. For example, word/phrase embeddings, language models, and/or similarity matrices may be used to identify similarities between the data fields of the systems.

For example, the description of each data item in the legacy system may be compared with the description of each data item in the target system of the same or similar data type to find the best match. Which data types are similar depends on the exact configuration of the legacy and target systems but will be recognized by those of ordinary skill in the art. For example, all data types holding strings may be considered similar, regardless of their actual name as implemented. Additionally, all numeric data types may be considered similar, and all date/time data types may be considered similar.

The data descriptions in both systems may be extracted from the data sources (e.g., using the IR/IE techniques disclosed in U.S. patent application Ser. No. 17/491,361) and cleaned as necessary. The descriptions may then be tokenized by removing stop words and retaining core (stem) information of the descriptions. Then the tokenized and stemmed descriptions may be vectorized (i.e., converted to a set of vectors) by a vectorization process such as Doc2Vec. Finally, for each vectorized data item description in the legacy system, a similarity calculation (e.g., x-similarity, cosine similarity, etc.) can be applied as compared to each vectorized data item description in the target system. The comparison with the highest similarity score is then selected as the match for each legacy data item if the highest similarity score is greater than a predefined threshold. If there is no similarity score higher than the threshold, the legacy data item is considered to not be present in the target system and is added to the target system in a later step.

In step 445, data item gaps, e.g., data items present in the legacy system but not in the target system, are identified based on the similarity scores calculated previously.

In step 450, data items in the legacy system but not in the target system are implemented in the target system. Data item descriptions for the new data items can be copied from the legacy system for use in future analysis.

In step 460, data sets of the legacy system may be migrated to the target system using the corresponding data items and any new data items generated in the prior step. If the target system includes data items that are required but are not present in the legacy system, the required data can be generated by business rules or one or more AI models that are created by the data modeling system 280. The models may be trained using historical data from the legacy system.

Some of the data in the legacy system may be able to be transferred directly to the target system. However, other data may not be directly compatible between the two systems. In these instances, the data from the legacy system may be converted to the format required by the target system.

Other data required by the target system may simply not exist on the legacy system. However, in such instances, the required data may be able to be predicted based on other data in the legacy system. As such, one or more models (e.g., machine learning models) may be generated to predict such data.

Figure 5:
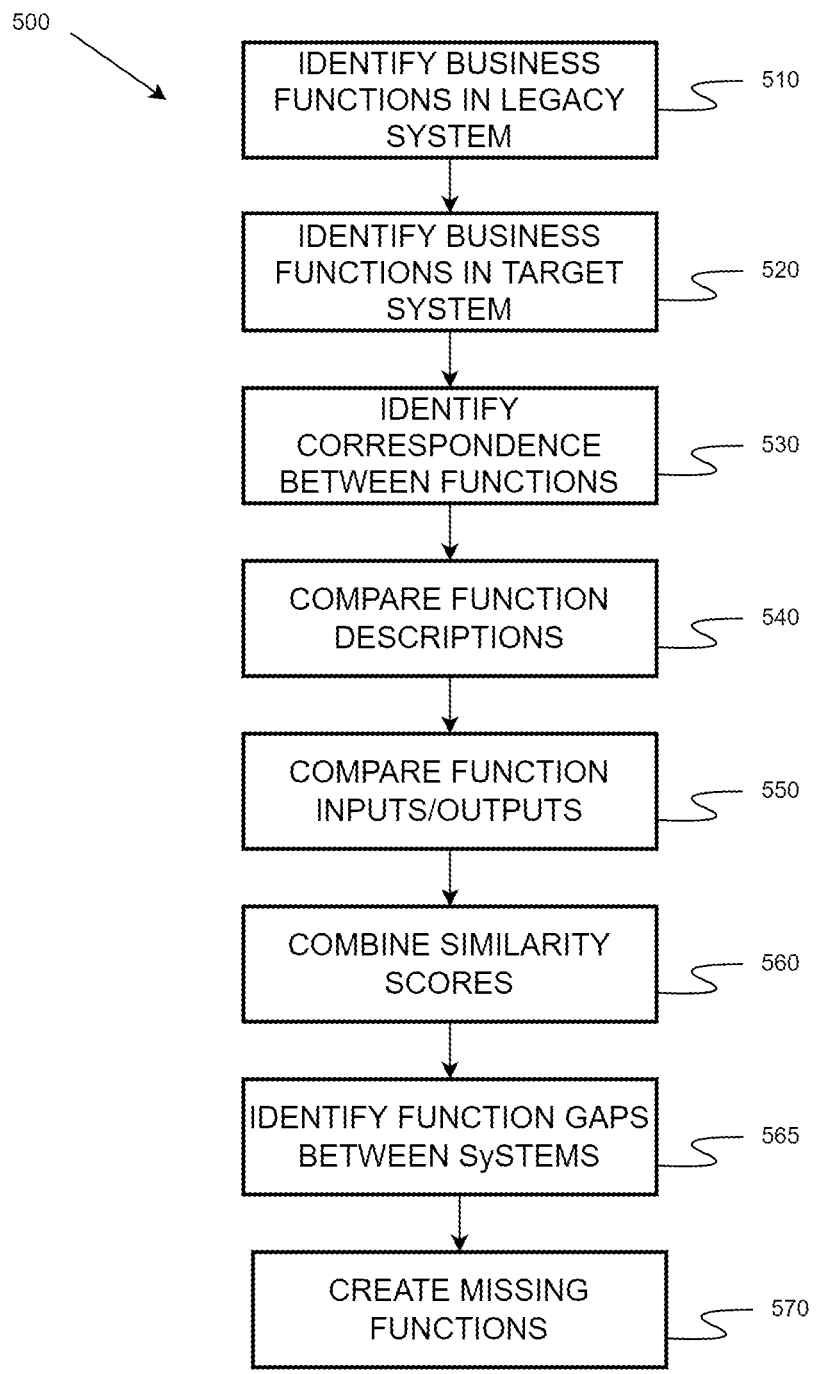
FIG. 5 illustrates one example of a method for migrating a business function from a legacy administration system to a target administration system.

FIG. 5 illustrates one example of a method 500 for creating business functions or processes in the target system 230 based on business functions or process in the legacy system 220. In step 510, the business processes/functions of the legacy system, such as product alternation processes, customer communication processes, product pricing engines, underlying business rules, etc., are identified.

In step 520, the business processes/functions in the target system are identified.

In step 530, processes in the target system that correspond to processes in the legacy system are identified using AI techniques, such as NLP.

For example, function descriptions in the legacy system may be compared with function descriptions in the target system to create a description similarity score in step 540. The function descriptions in both systems may extracted from the data sources and cleaned as necessary. The descriptions may then be tokenized by removing stop words and retaining core (stem) information of the descriptions. Then the tokenized and stemmed descriptions may be vectorized (i.e., converted to a set of vectors) by a vectorization process such as Doc2Vec. Finally, for each vectorized function description in the legacy system, a similarity score (e.g., x-similarity, cosine similarity, etc.) can be generated with respect to each vectorized function description in the target system.

Data inputs and outputs for functions in the legacy system may be compared with data inputs and outputs for functions in the target system in step 550. Based on the comparison, a data similarity score may be created for each pair of functions. In an embodiment, the data similarity score is calculated by comparing the data variable inputs of the legacy function with the data variable inputs of the target function as described with respect to FIG. 4. Data variables have data types and descriptions, so the same method can be used. The output variables can also be compared, and the individual data variable similarity scores can be combined into an overall data similarity score.

In step 560, the similarity scores are combined (e.g., through addition, multiplication, scaling, or other methods of combining) and the function in the target system with the highest combined similarity score is then selected as the corresponding function for each legacy function if the highest combined similarity score is greater than a predefined threshold. If there is no similarity score higher than the threshold, the legacy function is considered to not be present in the target system and is added to the target system in a subsequent step.

In step 565, functionality gaps, e.g., functionality present in the legacy system but not in the target system, are identified based on the similarity scores calculated previously.

In step 570, all missing business functions/processes in the legacy system are created in the target system, including any required business rules and data items.

Figure 6:
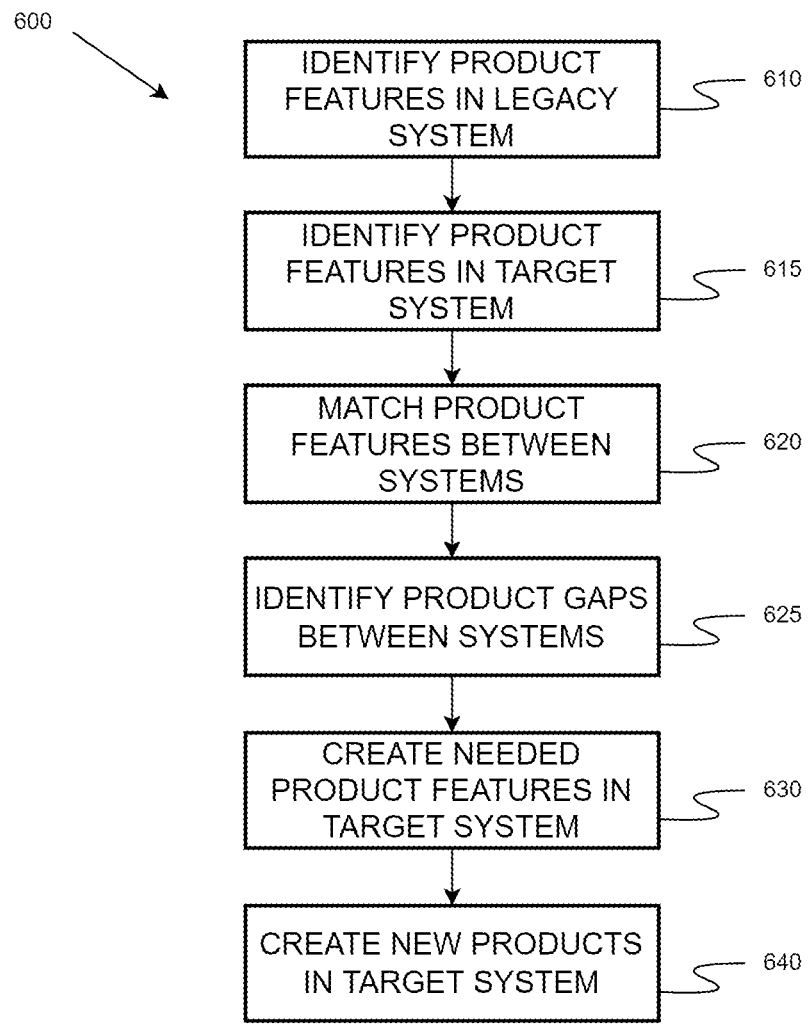
FIG. 6 illustrates one example of a method for migrating a product from a legacy administration system to a target administration system.

FIG. 6 illustrates one example of a method 600 for creating new products in the target system 230 based on products in the legacy system 220. In an embodiment, the method creates products in the target system with identical product features and premium amount as the products in the legacy system. In an embodiment, for products in the legacy system with no current policyholders no new product in the target system will be created.

In step 610, product terms, product conditions, benefit schedules, policy definitions, and other features of the legacy products are identified. In addition, the premium amount of each legacy product is calculated and/or otherwise identified (e.g., if it is stored in the legacy system). Where policy documents are available, natural language processing (NLP) or other AI techniques (e.g., as disclosed in U.S. patent application Ser. No. 17/491,361) may be used to identify features (including, e.g., product terms, product conditions, and other product rules), calculation methodologies, premium amounts, etc., from the available policy document(s) that relate to the products.

In an embodiment, only the most appropriate and reliable features with respect to product differentiation are extracted from the policy documents. Such features may include, but are not limited to, incontestability, renewal policy, payment options, grace period, paid-up options, beneficiaries, extended term insurance, reinstatement, etc.

In step 615, product terms, product conditions, benefit schedules, policy definitions, and other features of the target system products are identified. In addition, the premium amount of each target system product is calculated and/or otherwise identified (e.g., if it is stored in the legacy system). Where policy documents are available, natural language processing (NLP) or other AI techniques (e.g., as disclosed in U.S. patent application Ser. No. 17/491,361) may be used to identify features (including, e.g., product terms, product conditions, and other product rules), calculation methodologies, premium amounts, etc., from the available policy document(s) that relate to the products.

In step 620, product features in the legacy system that correspond to the product features in the target system are identified. Correspondence between product features may be determined used AI techniques, such as NLP.

For example, product feature text or product feature descriptions in the legacy system may be compared with product feature text or descriptions in the target system to create similarity scores. The feature text and/or descriptions in both systems may extracted from the data sources and cleaned as necessary. The text and/or descriptions may then be tokenized by removing stop words and retaining core (stem) information of the descriptions. Then the tokenized and stemmed text and/or descriptions may be vectorized (i.e., converted to a set of vectors) by a vectorization process such as Doc2Vec. Finally, for each vectorized text and/or description in the legacy system, a similarity score (e.g., x-similarity, cosine similarity, etc.) can be generated with respect to each vectorized feature text and/or description in the target system, and the target feature with the highest score may be selected as the matching feature for that legacy feature if the similarity score is above a threshold. Similarity scores for products can then be calculated by combining the individual scores for each feature. As with product features, the target product with the highest combined score may be selected as the matching product for the legacy product if the similarity score is above a threshold.

In step 625, product gaps, e.g., products present in the legacy system but not in the target system, are identified based on the similarity scores calculated previously.

In step 630, if any product features required by a legacy product are not present in the target system, they are created in the target system.

In step 640, for each product in the legacy system, a corresponding new product is created in the target system using the corresponding product features. The premium of the new product created in the target system is also ensured to be identical to the premium of the legacy product.

Figure 7:
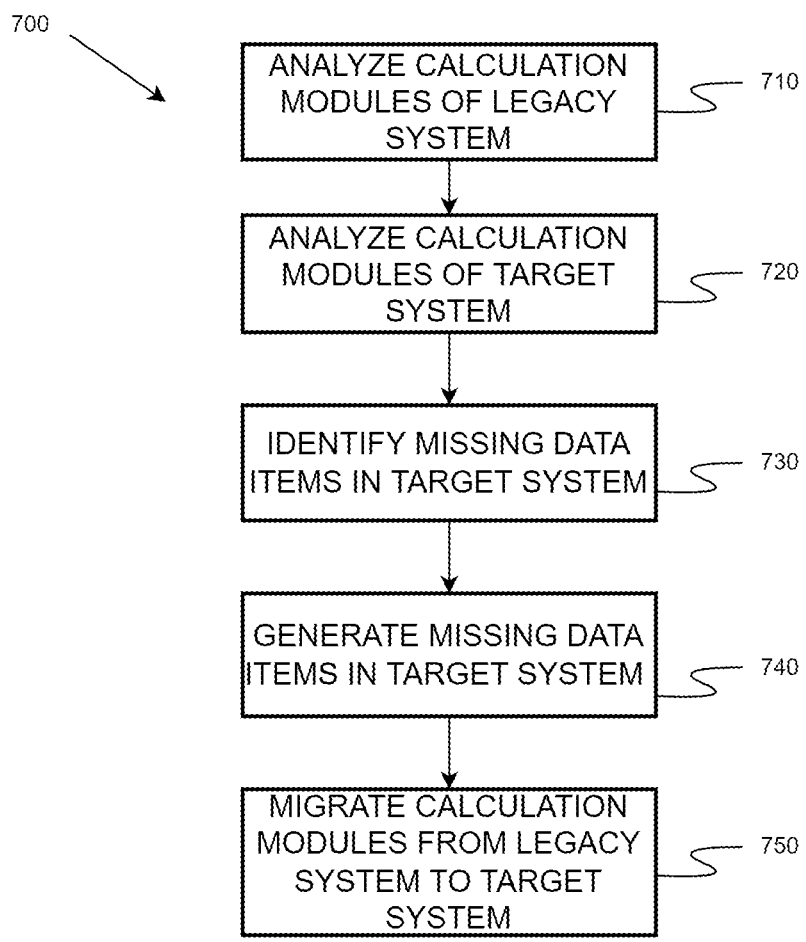
FIG. 7 illustrates one example of a method for migrating a calculation module from a legacy administration system to a target administration system.

FIG. 7 illustrates one example of a method 700 for migrating calculation modules from the legacy system 220 to the target system 230. In step 710, the calculation modules of the legacy system are analyzed to identify required inputs and outputs for each calculation module, e.g., by analysis system 240. In general, the inputs and outputs will be data points from a data structure in the legacy system.

In step 720, the calculation modules of the target system are analyzed to determine which of the legacy system calculation modules already exist in the target system. This analysis may be performed by analysis system 240 and correspondence between calculation modules in the legacy system and calculation modules in the target system may be determined using AI techniques similar to those described above, e.g., by using NLP techniques on the calculation module descriptions to find the most similar calculation module in the target system for each calculation module in the legacy system. For a given calculation module in the legacy system, if none of the similarity scores of calculation modules in the target system are above a predefined threshold, then that calculation module is determined to not exist in the target system.

In step 730, for each legacy system calculation module that does not exist in the target system, data points that are required by that calculation module but do not exist in the target system are identified using techniques identical or similar to those described with respect to FIG. 4.

In step 740, any missing data points identified in the prior step are generated in the target system.

In step 750, the missing calculation modules are generated in the target system based on business rules as described herein.

After the data items, functionality, and products from the legacy systems are implemented into the target system, data may be migrated from the legacy system to the target system. If data for a field required by the target system is missing from the legacy system, data models may be trained and used to populate the missing data.

Figure 8:
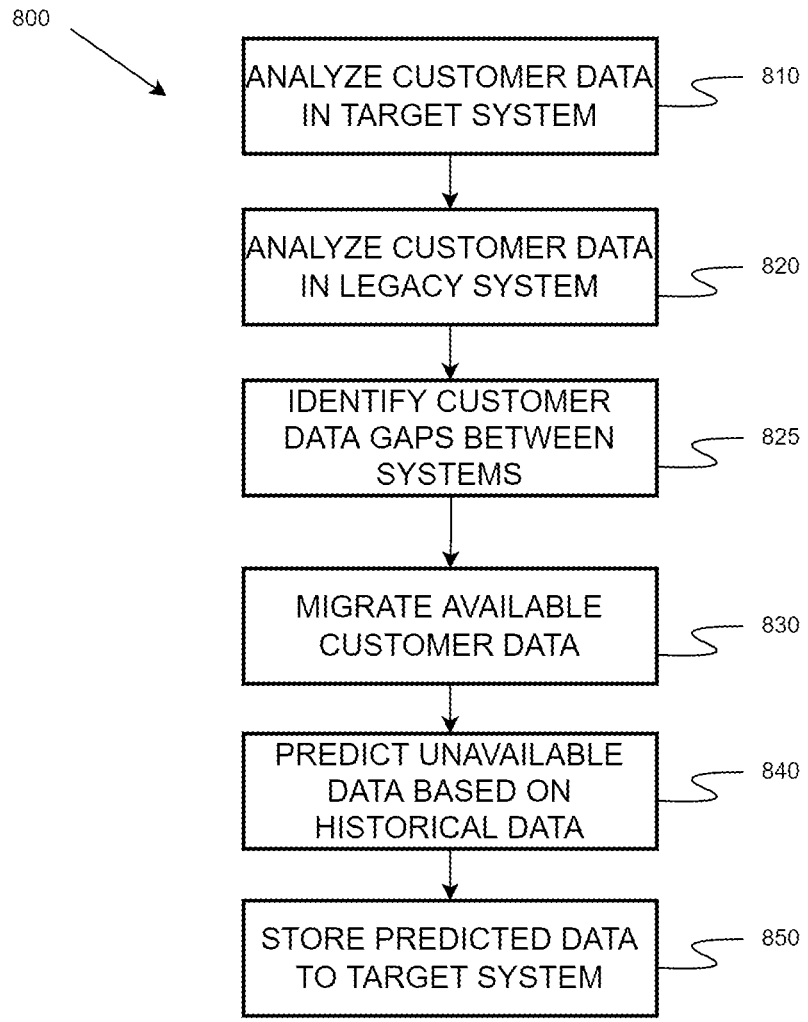
FIG. 8 illustrates one example of a method for migrating a data set from a legacy administration system to a target administration system.

FIG. 8 illustrates an example of a method 800 for migrating a customer data set from the legacy system to the target system. A customer data set may comprise information relating to each customer, e.g., personal information, financial information, asset information, etc.

In step 810, the data structures for the customer data set in the target system 230 are analyzed, to determine the customer data stored by the target system. The particular customer data fields that are required by the target system (e.g., because they are required as part of the underlying data model or as a required input to a process or calculation module, etc.) are also determined.

In step 820, the analysis system analyzes the data structures for the customer data in the legacy system to determine the customer data stored by the legacy system. In an embodiment, customer data items may be divided into at least three subsets: 1) data items that are present in both systems; 2) data items that are present in the legacy system but not in the target system; and 3) data items that are present in the target system but not in the legacy system.

In step 825, customer data gaps, e.g., data present in the legacy system but not in the target system, and data present in the target system but not in the legacy system, are identified.

In step 830, for data items that are present in both systems, corresponding data is migrated from the legacy system to the target system. During migration, the data may be converted to a format required by the target system.

In step 840, for data items present in the target system but not present in the legacy system (especially if such data is required by the target system), the corresponding data is predicted by one or more AI models that are created by data modeling system 280 or business rules. The models may be trained using historical data from the legacy system. The target of the model may be the output of a business process, for example, the price of some product or policy with different attributes and/or characteristics. In a specific example, the attributes and/or characteristics of a product or policy can be used as inputs and the prices as the labels or target of a ML model.

In step 850, the customer data predicted in step 840 is stored in the target system.

Administration systems converted using the techniques described herein will see improved operation efficiency, result accuracy, and process transparency. The conversion techniques also help ensure that the outputs of business functions/processes and calculation modules are matched between the legacy system and the target system.

Conversion or migration of products, data definitions, and/or functionalities from the legacy system to the target system may accomplished in various ways, and the present invention is not limited to the methods explicitly disclosed herein. For example, functionalities may be converted individually, in groups, or all at once in parallel. Required data points may be created in the target system as each functionality is processed, or several functionalities may be analyzed in a group, and all required data points for the group created prior to converting the functionalities themselves. Similarly, required product features may be created in the target system as each product is processed, or several products may be analyzed in a group, and all required product features for the group created prior to converting the products themselves. One of ordinary skill in the art will recognize additional variations of the disclosed methods.

Historical data used to train used AI models to generate missing data may first be cleaned, joined, segmented, aggregated, and/or feature engineered, as necessary. Cleaning the data involves, e.g., standardizing data types and values, removing duplicated variables, removing variables with a unique value, removing obviously non-predictive variables (e.g., user id, etc.), etc.

Joining data involves collecting related data together via a common key, so data for relevant real world entities (e.g., policyholders, claimants, etc.), events (e.g., claims), etc., are associated.

Segmenting data relates to dividing the data into groups based on a common characteristic, e.g., geographic area, age, etc. Such groups are preferably segmented based on a characteristic that is more deterministic with respect to the target of the model than other characteristics.

To the extent necessary, data is aggregated to a desired granularity. The appropriate granularity will depend on the type and structure of the input variables, the target, the quantity and volatility of the input variables, and other factors.

Data to be used in training models may be extracted from unstructured data sources, e.g., text, images, videos, audio recordings, etc. For example, for unstructured text sources, the extracted features may be related to the sentiment of the text (e.g., using sentiment analysis), topics discussed in the text (e.g., using topic modeling), presence of keywords, context analysis, and other types of natural language processing or textual analysis. For images, the extracted features may be related to foreground objects, background objects, features in an embedded image space, etc. For audio recordings, the extracted features may be related to sentiment (e.g., using tonal analysis), etc.

In some embodiments, the number of potential input variables may number in the thousands, and it would be impractical to train AI models using all of the variables. In such embodiments, feature engineering techniques may be used to reduce the number of variables. For example, variables with incomplete or sparse data, variables with low variance, highly correlated variables, and noisy variables may be removed from the dataset.

To further reduce the number of variables, the relative contribution of each of the variables in the data set in predicting the target value may be calculated, and only the variables with the most influence may be kept in the dataset.

After the dataset is prepared and tagged, the AI model may be trained. A hyperparameter autotuning engine may be used to tune the hyperparameters of the AI models. The number and type of hyperparameters depend on the type of model. For multi-layer perceptron (MLP) models, hyperparameters include numbers of layers, size of layers, number of nodes, number of hidden units, activation function, learning rate, momentum, etc. In one embodiment, the hyperparameter autotuning engine may comprise multiple GPUs that generate many variations of a model, each with different hyperparameters. The variations may then be tested or evaluated to determine the best or most acceptable model.

Embodiments of the subject matter and the functional operations described in this specification can be implemented in one or more of the following: digital electronic circuitry; tangibly-embodied computer software or firmware; computer hardware, including the structures disclosed in this specification and their structural equivalents; and combinations thereof. Such embodiments can be implemented as one or more modules of computer program instructions encoded on a non-transitory medium for execution by a data processing apparatus. The computer storage medium can be one or more of: a machine-readable storage device, a machine-readable storage substrate, a random or serial access memory device, and combinations thereof.

As used herein, the term "data processing apparatus" comprises all kinds of apparatuses, devices, and machines for processing data, including but not limited to, a programmable processor, a computer, and/or multiple processors or computers. Exemplary apparatuses may include special purpose logic circuitry, such as a field programmable gate array ("FPGA") and/or an application specific integrated circuit ("ASIC"). In addition to hardware, exemplary apparatuses may comprise code that creates an execution environment for the computer program (e.g., code that constitutes one or more of: processor firmware, a protocol stack, a database management system, an operating system, and a combination thereof).

The term "computer program" may also be referred to or described herein as a "program," "software," a "software application," a "module," a "software module," a "script," or simply as "code." A computer program may be written in any programming language, and it can be deployed in any form, including as a standalone program or as a module, component, subroutine, or other unit suitable for use in a computing environment. A computer program can be deployed and/or executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, such as but not limited to an FPGA and/or an ASIC.

Computers suitable for the execution of the one or more computer programs include, but are not limited to, general purpose microprocessors, special purpose microprocessors, and/or any other kind of central processing unit ("CPU"). Generally, CPU will receive instructions and data from a read only memory ("ROM") and/or a random access memory ("RAM").

Computer readable media suitable for storing computer program instructions and data include all forms of nonvolatile memory, media, and memory devices. For example, computer readable media may include one or more of the following: semiconductor memory devices, such as ROM or RAM; flash memory devices; magnetic disks; magneto optical disks; and/or CD-ROM and DVD-ROM disks. The processor and the memory can be supplemented by, or incorporated in, special purpose logic circuitry.

To provide for interaction with a user, embodiments may be implemented on a computer having any type of display device for displaying information to a user. Exemplary display devices include, but are not limited to one or more of: projectors, cathode ray tube ("CRT") monitors, liquid crystal displays ("LCD"), light-emitting diode ("LED") monitors, and/or organic light-emitting diode ("OLED") monitors. The computer may further comprise one or more input devices by which the user can provide input to the computer. Input devices may comprise one or more of: keyboards, pointing devices (e.g., mice, trackballs, etc.), and/or touch screens. Moreover, feedback may be provided to the user via any form of sensory feedback (e.g., visual feedback, auditory feedback, or tactile feedback). A computer can interact with a user by sending documents to and receiving documents from a device that is used by the user (e.g., by sending web pages to a web browser on a user's client device in response to requests received from the web browser).

Embodiments of the subject matter described in this specification can be implemented in a computing system that includes one or more of the following components: a backend component (e.g., a data server); a middleware component (e.g., an application server); a frontend component (e.g., a client computer having a graphical user interface ("GUI") and/or a web browser through which a user can interact with an implementation of the subject matter described in this specification); and/or combinations thereof. The components of the system can be interconnected by any form or medium of digital data communication, such as but not limited to, a communication network. Non-limiting examples of communication networks include a local area network ("LAN") and a wide area network ("WAN"), e.g., the Internet.

The computing system may include clients and/or servers. The client and server may be remote from each other and interact through a communication network. The relationship of client and server arises by virtue of computer programs running on the respective computers and having a client-server relationship to each other.

Various embodiments are described in this specification, with reference to the detailed discussed above, the accompanying drawings, and the claims. Numerous specific details are described to provide a thorough understanding of various embodiments. However, in certain instances, well-known or conventional details are not described in order to provide a concise discussion. The figures are not necessarily to scale, and some features may be exaggerated or minimized to show details of particular components. Therefore, specific structural and functional details disclosed herein are not to be interpreted as limiting, but merely as a basis for the claims and as a representative basis for teaching one skilled in the art to variously employ the embodiments.

The embodiments described and claimed herein and drawings are illustrative and are not to be construed as limiting the embodiments. The subject matter of this specification is not to be limited in scope by the specific examples, as these examples are intended as illustrations of several aspects of the embodiments. Any equivalent examples are intended to be within the scope of the specification. Indeed, various modifications of the disclosed embodiments in addition to those shown and described herein will become apparent to those skilled in the art, and such modifications are also intended to fall within the scope of the appended claims.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

All references including patents, patent applications and publications cited herein are incorporated herein by reference in their entirety and for all purposes to the same extent as if each individual publication or patent or patent application was specifically and individually indicated to be incorporated by reference in its entirety for all purposes.

What is claimed is:

1. A method for migrating a part of a legacy administration system, the legacy administration system comprising legacy data items, legacy functionality, and legacy product types, to a target administration system, the target administration system comprising target data items, target functionality, and target product types, each legacy data item and target data item comprising at least one data type, the method comprising:
    comparing a legacy data item with each target data item of the same or similar type and calculating a similarity score for each comparison;
    identifying a matching target data item when the similarity score is greater than or equal to a threshold value;
    creating a new data item in the target administration system corresponding to the legacy data item when a matching data item is not found;
    comparing a legacy functionality with each target functionality and calculating a similarity score for each comparison;
    identifying a matching target functionality when the similarity score is greater than or equal to a threshold value; and
    creating a new functionality in the target administration system corresponding to the legacy functionality when a matching functionality is not found;
    thereby migrating the legacy data item and the legacy functionality from the legacy administration system to the target administration system.

2. The method of claim 1, wherein the comparing a legacy data item with each target data item comprises using natural language processing (NLP).

3. The method of claim 2, wherein the comparing a legacy data item with each target data item comprises:
    tokenizing and stemming a description associated with the legacy data item;
    tokenizing and stemming descriptions associated with the target data items;
    vectorizing the tokenized and stemmed legacy data item description;
    vectorizing the tokenized and stemmed target data item descriptions; and
    calculating a similarity score between the vectorized legacy data item description and each vectorized target data item description.

4. The method of claim 3, wherein at least one data item description is extracted from a data source using image processing and optical character recognition (OCR).

5. The method of claim 1, wherein the comparing a legacy functionality with each target functionality comprises using natural language processing (NLP).

6. The method of claim 5, wherein the comparing a legacy functionality with each target functionality comprises:
    tokenizing and stemming a description associated with the legacy functionality;
    tokenizing and stemming descriptions associated with the target functionalities;
    vectorizing the tokenized and stemmed legacy functionality description;
    vectorizing the tokenized and stemmed target functionality descriptions;
    calculating a description similarity score between the vectorized legacy functionality description and each vectorized target functionality description.

7. The method of claim 6, wherein at least one functionality description is extracted from a data source.

8. The method of claim 6, wherein the legacy functionality comprises a set of inputs and a set of outputs, each target functionality comprises a set of inputs and a set of outputs, and wherein the comparing a legacy functionality with each target functionality further comprises comparing the set of inputs of the legacy functionality with the set of inputs of each target functionality and comparing the set of outputs of the legacy functionality with the set of outputs of each target functionality to determine a data similarity score for each comparison.

9. The method of claim 8, wherein the description similarity score and the data similarity scores for each comparison are combined to generate an overall similarity score for each function comparison.

10. The method of claim 1, further comprising:
    identifying data required by the target system not present in the legacy system;
    generating a prediction model targeting the required data and trained using historical data or business rules in the legacy system;
    predicting the required data using the prediction model; and
    storing the predicted data in the target system.

11. The method of claim 1, further comprising generating a product type mapping between the legacy system and the target system, the generating comprising:
    identifying at least one associated policy form for each product type in the legacy system;
    identifying at least one associated policy form for each product type in the target system;
    extracting features and associated descriptions from the identified forms using image processing and NLP;
    for each product feature in the legacy system, calculating similarity scores between the legacy feature and each feature in the target system using the associated descriptions; and
    for each product in the legacy system, calculating a combined similarity score between the legacy product and each product in the target system using the feature similarity scores.

12. A system for migrating a part of a legacy administration system, the legacy administration system comprising legacy data items and legacy functionality, to a target administration system, the target administration system comprising target data items and target functionality, each legacy data item and target data item comprising at least one data type, the system comprising:

a data mapping system adapted to compare a legacy data item with each target data item of the same or similar type and calculate a similarity score for each comparison;

a function mapping system adapted to compare a legacy functionality with each target functionality and calculate a similarity score for each comparison;

a product mapping system adapted to compare a legacy product with each target product to identify a target product that matches the legacy product;

a migration system adapted to:
 convert at least one data item from the legacy administration system to the target administration system using the similarity scores calculated for the data item comparisons;
 convert at least one functionality from the legacy administration system to the target administration system using the similarity scores calculated for the functionality comparisons; and
 convert at least one product from the legacy administration system to the target administration system using the similarity scores calculated for the product comparisons.

13. The system of claim 12, wherein the data mapping system is adapted to compare a legacy data item with each target data item using natural language processing (NLP).

14. The system of claim 13, wherein the comparing a legacy data item with each target data item comprises:
 tokenizing and stemming a description associated with the legacy data item;
 tokenizing and stemming descriptions associated with the target data items;
 vectorizing the tokenized and stemmed legacy data item description;
 vectorizing the tokenized and stemmed target data item descriptions;
 calculating a similarity score between the vectorized legacy data item description and each vectorized target data item description.

15. The system of claim 14, wherein at least one data item description is extracted from a data source using a data processing system using image processing and optical character recognition (OCR).

16. The system of claim 12, wherein the function mapping system is adapted to compare a legacy functionality with each target functionality using natural language processing (NLP).

17. The system of claim 16, wherein the comparing a legacy functionality with each target functionality comprises:
 tokenizing and stemming a description associated with the legacy functionality;
 tokenizing and stemming descriptions associated with the target functionalities;
 vectorizing the tokenized and stemmed legacy functionality description;
 vectorizing the tokenized and stemmed target functionality descriptions;
 calculating a similarity score between the vectorized legacy functionality description and each vectorized target functionality description.

18. The system of claim 17, wherein at least one functionality description is extracted from a data source using image processing and optical character recognition (OCR).

19. The system of claim 17, wherein the legacy functionality comprises a set of inputs and a set of outputs, each target functionality comprises a set of inputs and a set of outputs, and wherein the comparing a legacy functionality with each target functionality further comprises comparing the set of inputs of the legacy functionality with the set of inputs of each target functionality and comparing the set of outputs of the legacy functionality with the set of outputs of each target functionality to determine a data similarity score for each comparison.

20. The system of claim 19, wherein the function mapping system is adapted to combine the description similarity score and the data similarity score for each comparison to generate an overall similarity score for each comparison.

21. The system of claim 12, further comprising a data modeling system, and wherein the migration system is configured to:
 identify data required by the target system not present in the legacy system;
 generate a prediction model using the data modeling system, the prediction model targeting the required data and trained using historical data in the legacy system;
 predict the required data using the prediction model; and
 store the predicted data in the target administration system.

22. The system of claim 12, wherein the product mapping system is configured to generate a product type mapping between the legacy system and the target system, the generating comprising:
 identifying at least one associated policy form for each product type in the legacy system;
 identifying at least one associated policy form for each product type in the target system;
 extracting features and associated descriptions from the identified forms using image processing and NLP;
 for each product feature in the legacy system, calculating similarity scores between the legacy feature and each feature in the target system using the associated descriptions; and
 for each product in the legacy system, calculating a combined similarity score between the legacy product and each product in the target system using the feature similarity scores.

* * * * *